Dec. 12, 1944.    L. C. BLAIR    2,364,889
LUMINOUS DISCHARGE LAMP ESPECIALLY FOR
PHOTOGRAPHIC ENLARGERS AND PROJECTORS
Filed Dec. 10, 1940    2 Sheets-Sheet 2
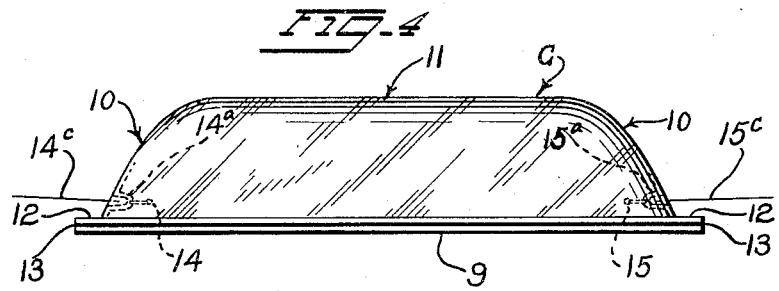
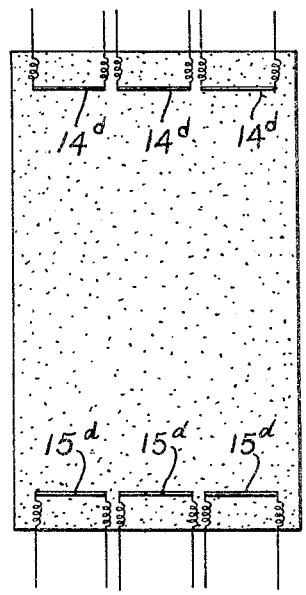
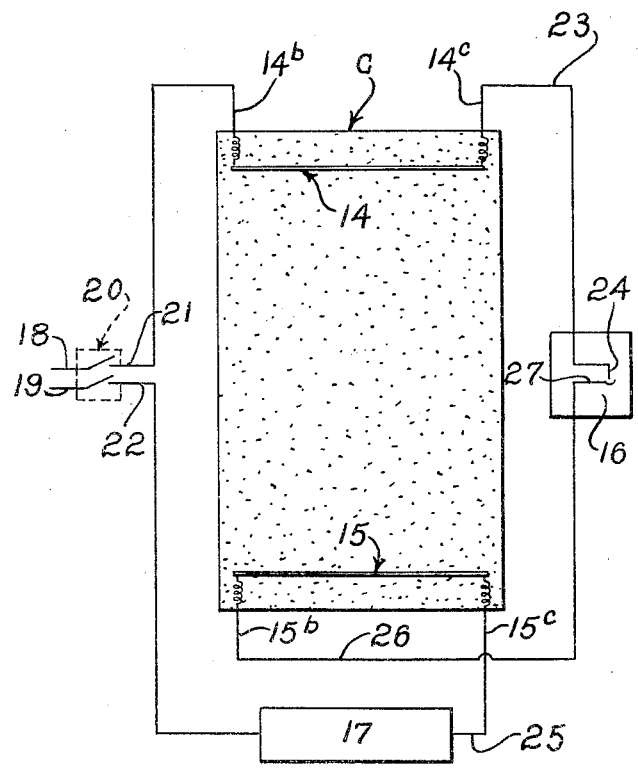
Inventor
L. C. Blair.
By Baldwin & Wight
his Attorneys Patented Dec. 12, 1944

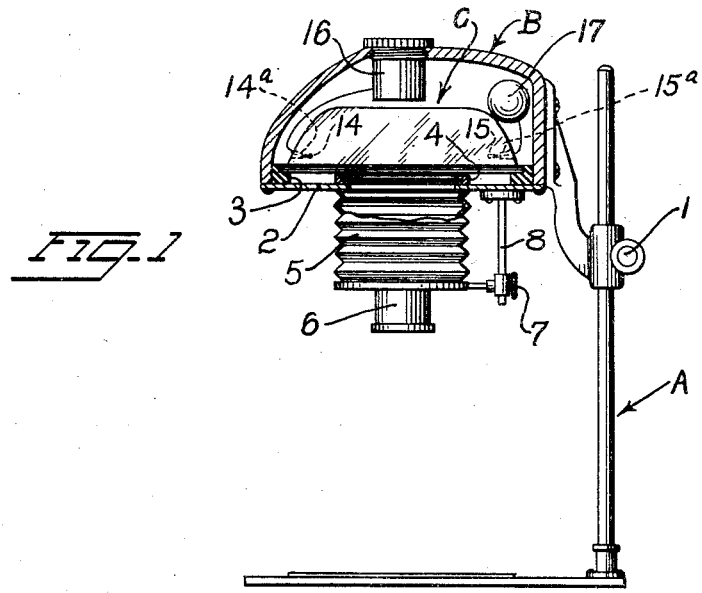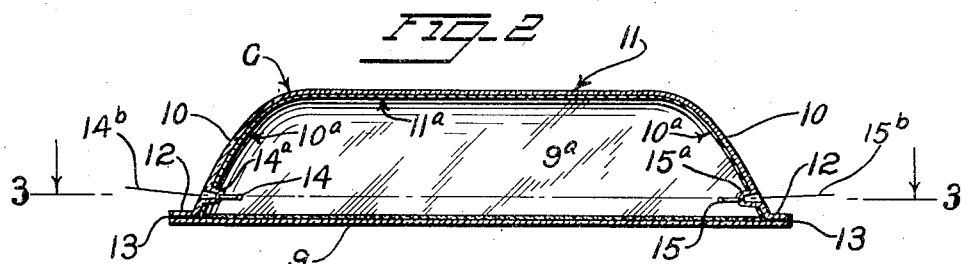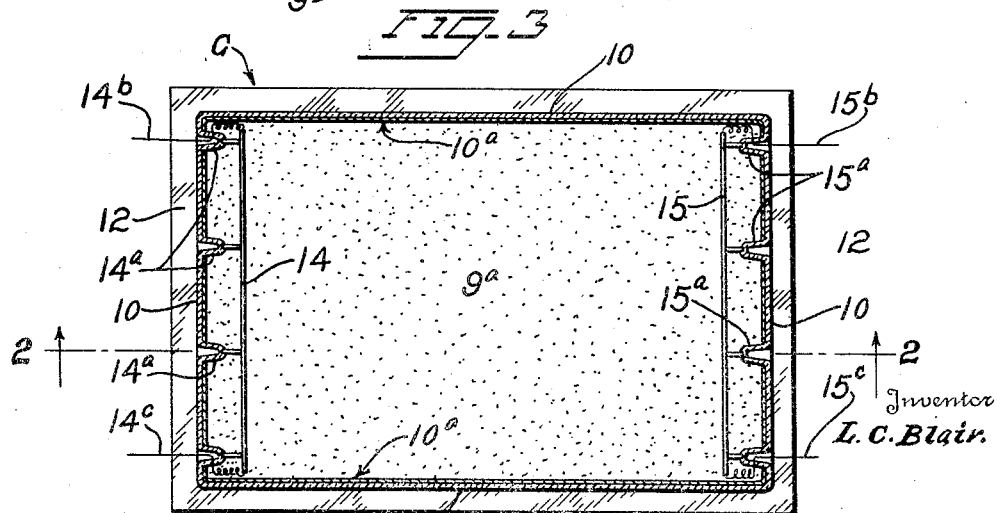

2,364,889

UNITED STATES PATENT OFFICE 2,364,889

LUMINOUS DISCHARGE LAMP ESPECIALLY FOR PHOTOGRAPHIC ENLARGERS AND PROJECTORS

Lyman C. Blair, Houston, Tex.

Application December 10, 1940, Serial No. 369,487

2 Claims. (Cl. 176—122)

This invention relates to luminous discharge lamps, and more particularly to such lamps especially adapted for incorporation in or use in connection with photographic enlargers and projectors.

In most photographic enlargers or projectors a diffusing screen or a condenser is interposed between the source of light for projection and the negative film or plate carrier. Heretofore this usually has been necessary in order to provide, in so far as possible, uniform illumination of the negative. Incandescent lamps generate large amounts of heat, and special means for cooling are usually necessary.

An object of the present invention is to provide a lamp especially for a photographic enlarger or projector, adapted to provide uniform illumination over a substantial area; that is, an area equal to or greater than the area of the negative or negative carrier, thus dispensing with the necessity of using a separate diffusing screen or condenser.

Another object is to provide such a lamp which is capable of operating at a low temperature, thus avoiding damage to the photographic emulsion on the negative, and making possible the use of longer exposure times than heretofore has been practicable. The use of longer exposure times permits more accurate photographic work to be done, especially in retouching or dodging, and permits the use of enlarging lenses with smaller apertures. Such lenses are less expensive, give a greater depth of focus, and make possible greater "perspective correction."

A further object is to provide an improved photographic enlarging or projecting apparatus embodying a lamp of the character referred to.

A still further object is to provide an improved gaseous discharge type electric lamp having characteristics rendering it efficient in various other uses or applications.

Other objects will become apparent from the following detailed description, the appended claims, and the accompanying drawings, in which:

Figure 1 is a view parly in section and partly in elevation of a photographic lamp or projector embodying the invention;

Figure 2 is a vertical sectional view of a luminous discharge lamp embodying the invention, the section being drawn on an enlarged scale as compared to Figure 1 and being on the line 2—2 of Figure 3;

Figure 3 is a horizontal section on the line 3—3 of Figure 2;

Figure 4 is an edge elevation of the lamp shown in Figures 2 and 3;

Figure 5 is a schematic view including a wiring diagram for the lamp shown in Figures 2 to 4, inclusive; and Figure 6 is a diagrammatic plan view of a modified form of lamp.

In its general nature, a lamp constructed in accordance with the invention includes a hermetically sealed container having as one of its walls a preferably flat glass front plate through which light passes. The container advantageously may be somewhat flat and preferably includes a rear wall formed as a reflector in any suitable manner, e. g., being coated or provided with a reflecting surface. The front plate thus constitutes a translucent wall. Preferably also the front plate is coated with luminescent material such, for example, as any of the luminescent materials now used on the ordinary fluorescent lamps now available for general use. The space within the container is filled with argon or other rare atmospheric gas and contains a small amount of mercury. At opposite ends of the space, elongated rod or wire shaped electrodes are positioned respectively, preferably in parallelism with each other. The electrodes should be very long in comparison to their transverse sections, and each may be continuous in length or may comprise a series of shorter electrode parts arranged end-to-end. The electrodes, being connected to a source of current, provide for the formation of an intervening arc which emits a strong band of ultra-violet light with a wave length of 2537 Angstrom units in the mercury resonance band. The light passing through the luminescent wall is converted into light of a longer wave length in the visible spectrum.

The embodiment of the invention shown in Figures 1 to 5, inclusive, comprises a photographic enlarger including a stand A, and a lamp house casing B adjustably mounted as at 1 on the stand. The casing B includes a plate 2 positioned over the open bottom of the casing proper and serving to mount a gasket 3, a negative carrier 4, and a bellows 5 at the lower end of which is carried a lens unit 6 adapted to be maintained in adjusted position by a clamp screw 7 cooperable with a supporting rod 8.

Mounted within the casing B on the gasket 3 is a gaseous electric discharge lamp C constructed in accordance with the present invention, and the details of which are shown more clearly in Figures 2, 3, and 4. The lamp C comprises a container which includes a front translucent wall 9, side and end walls 10, and a rear reflecting wall 11, the container being generally flat or shallow, and rectangular in plan. The side, end, and rear walls 10 and 11 preferably are formed as a unit with a marginal flange 12 on which the front wall 9 is mounted, a suitable device or substance 13 being interposed in the joint to maintain the container hermetically sealed. It is to be understood that fused glass or any other suitable sealing medium may be employed for hermetically sealing this joint. Sealing wax, "Sealstix," Canada balsam, or other sealing media, are suggested as acceptable for this purpose. The combined side, end, and rear walls 10 and 11 are provided, preferably on their inside surfaces, with suitable reflecting surfaces 10ª and 11ª. The reflecting surface or surfaces may comprise a metallic "silvered" coating or a dull or matte white finish. The inside of the front wall or plate 9 is provided with a fluorescent or luminescent coating 9ª.

Elongated wire-like or strip-like electrodes 14—15 are mounted respectively in parallelism at opposite ends of the container by means of projections 14ª—15ª formed integrally with the end walls 10. The container is filled with argon or other suitable gas and a small quantity of mercury, as is common in ordinary gaseous electric discharge lamps. Conductors 14ᵇ—14ᶜ and 15ᵇ—15ᶜ are led respectively from opposite ends of the electrodes 14 and 15 through the adjacent end walls 10.

The lamp C is mounted in the casing B with the front wall 9 directly over or behind the negative carrier 4, the electrodes 14 and 15 being disposed outwardly beyond opposite edges of the negative carrier area. Preferably the lamp housing mounts suitable controls for the lamp, including a lamp starting "glow" switch 16 and a choke, condenser, or reactor device 17. The details of the switch 16 and device 17 do not per se constitute the present invention, and therefore are not shown. However, their connection in circuit with the lamp electrodes is shown diagrammatically in Figure 5, in which a source of current supply is indicated as including conductors 18 and 19 connectable through a master switch 20 with conductors 21 and 22. The conductor 21 leads to the conductor 14ᵇ and thence to one end of the electrode 14, the other end of which is connected through the conductor 14ᶜ to a conductor 23 which leads to a contact element 24 in the switch 16. The conductor 22 leads to one end of the device 17, and a conductor 25 leads from the other end thereof through the conductor 15ᶜ to one end of the electrode 15. The other end of this electrode leads through conductors 15ᵇ and 26 to a contact element 27 in the switch 16.

In operation, the master switch 20 and starter switch 16 are both closed to place the electrodes 14 and 15 in series with the supply lines, causing the electrodes to be heated by their resistance to passage of current. When the electrodes have been sufficiently pre-heated the starting switch 16 will be suddenly opened and the arc will be struck between the electrodes. The arc discharge will continue while the master switch 20 is maintained closed, and a uniform cool light will pass through the front wall 9 of the lamp.

The surface area of the electrodes should be small in relation to the current flowing between them, in order to produce a ribbon-like or sheet-like arc of uniform illuminating intensity. The behavior of electrical currents sometimes is explained by analogy to flow of fluids. Thus, in the present instance, the ribbon-like or sheet-like "flow" or arc between the electrodes 14 and 15 is analogous to the sheet- or ribbon-like flow of water from a long thin slit where the volume of water flowing is large with relation to the size of the slit. Tungsten filament electrodes have desirable characteristics for promoting the production of the desired ribbon-like or sheet-like arc.

Figure 6 shows diagrammatically a modified embodiment in which the electrode means at opposite ends of the lamp each comprises a plurality of serially aligned individual electrode portions 14ᵈ and 15ᵈ in end-to-end relation. The arrangement is such that the aligned electrode portions act together to promote the flow of a ribbon-like or sheet-like arc which is substantially continuous and of uniform illuminating intensity.

The preferred embodiments of the lamp disclosed herein have been described as being used in the lamp house of photographic enlarging or projecting apparatus. Lamps constructed in accordance with the invention are especially suitable for such use, but it will be apparent that they also may be used for other purposes when a cool light emitted uniformly over and throughout a substantial area is desirable. Various changes may be made without departing from the invention as defined in the claims.

I claim:

1. In a gaseous discharge type lamp for providing uniform illumination over a substantial area, a hermetically sealed container having a translucent wall of substantial area; elongated mutually independent and electrically parallel electrode means mounted within the container respectively adjacent opposite ends of said wall; a gaseous discharge medium within said container; and means for supplying current to said electrode means thereby to promote a ribbon-like luminous positive column discharge between said electrode means and generally paralleling said wall and effective to provide uniform illumination through said wall, at least one said electrode means comprising a plurality of serially aligned individual electrode portions.

2. In a gaseous discharge type lamp for providing uniform illumination over a substantial area, a hermetically sealed container having a translucent wall of substantial area; elongated mutually independent and electrically parallel electrode means mounted within the container in spaced apart, substantially parallel relation, and respectively adjacent opposite ends of said wall; a gaseous discharge medium within said container and extending uninterruptedly over the whole area of said translucent wall between and throughout the length of said electrode means; and means for supplying current to said electrode means thereby to promote an uninterrupted ribbon-like luminous positive column discharge between said electrode means and generally paralleling said wall and effective to provide uniform illumination through said wall, each said electrode means comprising a plurality of serially aligned electrode portions.

LYMAN C. BLAIR.